United States Patent

[11] 3,559,670

| [72] | Inventor | Shmariahu Yedidiah<br>West Orange, N.J. |
|---|---|---|
| [21] | Appl. No. | 791,015 |
| [22] | Filed | Jan. 14, 1969 |
| [45] | Patented | Feb. 2, 1971 |
| [73] | Assignee | Gamon-Calmet Industries, Inc.<br>Newark, N.J.<br>a corporation of Delaware. by mesne assignments |

[54] FLUID FLOW RATE ACTUATED CHANGE OVER VALVE
16 Claims, 3 Drawing Figs.

| [52] | U.S. Cl. | 137/110, 137/119, 137/608 |
|---|---|---|
| [51] | Int. Cl. | G05d 7/01 |
| [50] | Field of Search | 73/197; 137/608, 110, 118, 119 |

[56] References Cited
UNITED STATES PATENTS

| 1,186,802 | 6/1916 | Krueger | 73/197 |
|---|---|---|---|
| 1,251,484 | 1/1918 | Laval | 73/197 |
| 1,577,731 | 3/1926 | Krueger | 73/197 |
| 3,453,884 | 7/1969 | Marx | 73/197 |

Primary Examiner—William F. O'Dea
Assistant Examiner—William H. Wright
Attorney—Daniel H. Bobis ABSTRACT: A fluid flow rate actuated change over valve having one inlet, two outlets and a valve mechanism sensitive to the rate of fluid flow through the valve such that the discharge flow is directed into a low flow rate line or a high flow rate line dependent upon the rate of fluid flow.

PATENTED FEB 2 1971    3,559,670

SHMARIAHU YEDIDIAH
INVENTOR.

BY Daniel H. Bobis
Atty

FLUID FLOW RATE ACTUATED CHANGE OVER VALVE

BACKGROUND OF THE INVENTION

This invention relates generally to fluid flow control valves and more particularly to a valve for directing the fluid flow into one or another line depending upon the rate of flow through the valve.

The invention is particularly well suited for systems employing fluid flow meters wherein a high flow rate meter is not sensitive enough to accurately record the flow at low flow rates and a low flow rate meter is incapable of handling a high rate of flow.

Heretofore, valves of this general type could not change the path of fluid flow at clearly defined flow rates and often left both paths open at one time thereby causing both flow meters to record simultaneously. Further, the prior art valves have been slow in reacting thereby causing both paths to be open during a long time interval during the changeover thus necessitating the reading of both meters and adding their totals to obtain a result. Even this result, however, was inaccurate since, as previously mentioned, the high flow rate meter is inaccurate at low flow rates.

The present invention overcomes the above outlined problems by providing a valve wherein the internal dimensions of the valve body, and the weights and dimensions of the valve mechanism, are so chosen as to provide a positive snap on-off action to provide a very short time interval during changeover and to provide the changeover at clearly defined flow rates.

PRIOR ART

Pertinent prior art patents are U.S. Pat. Nos. 1,186,802; 1,577,731; and 1,251,484.

U.S. Pat. No. 1,186,802 discloses a valve also having one inlet and two outlet paths but the valve mechanism depends on a weight 5 to unseat the valve head 3 during low flow rate conditions.

By contrast, the present invention discloses a valve mechanism employing a balancing piston which serves to balance the pressure acting on the valve head and diaphragm or actuating disc thus making the valve insensitive to pressure changes in the system.

U.S. Pat. No. 1,577,731 discloses a valve having one inlet and two outlets and a differential valve and valve disc which by their vertical positions open or close the respective discharge paths. This reference depends on a collar bearing upon the upper end of a guide sleeve to support the valve disc and employs a weight to control the valve operation.

By contrast, the present invention provides, in addition to the balancing piston mentioned above, an actuator disc located in a suitably shaped inlet duct of varying cross section to provide a positive snap action to the valve mechanism.

U.S. Pat. No. 1,251,484 discloses a change valve in which a port aligns with an annular passage when high duty pressure is reached, thus relieving the pressure above the valve which results in the valve being thrown into fully open.

By contrast, the present invention discloses a valve in which the valve mechanism and valve body are so shaped and dimensioned as to provide a positive snap action at the changeover condition irrespective of the pressure changes in the valve.

Thus, none of the prior art references discloses a changeover valve wherein the valve mechanism actuator is located in a suitably shaped inlet duct and wherein the valve mechanism is provided with a balancing piston such that a positive snap action is provided to change the direction of flow almost instantaneously at clearly defined flow rates independently of pressure changes in the system.

SUMMARY OF THE INVENTION

Thus, the present invention covers an effective means for directing the flow of fluid into one or another line dependent upon the rate of fluid flow including; a valve body having a fluid chamber formed therein and an inlet and two outlets for fluid, a cylinder which functions as a high flow rate valve slidably engaging the walls of the fluid chamber and having a vertical passage therethrough for the low flow rate condition, and a valve mechanism vertically disposed in the cylinder and actuated by the rate of fluid flow through the valve, which functions to open or close the vertical passage through the cylinder dependent upon such rate of fluid flow.

Accordingly, it is an object of this invention to provide a valve for effectively directing the flow of fluid into one or another path dependent upon the rate of flow through the valve.

Another object of the invention is to provide a valve wherein the valve mechanism functions independently of and irrespective of pressure changes in the valve.

Another object of the invention is to provide a valve for directing the flow of fluid into one or another path wherein the changeover from one path to the other occurs at clearly defined flow rates.

It is another object of the invention to provide such a changeover from the one path to the other almost instantaneously.

Still, another object of the invention is to provide a changeover valve in which the valve mechanism will remain in a stable position except during the short time interval during actual changeover.

These and other objects and advantages of the invention are believed made clear by the following description thereof taken in conjunction with the accompanying drawings wherein:

IN THE DRAWINGS

Figure 1:
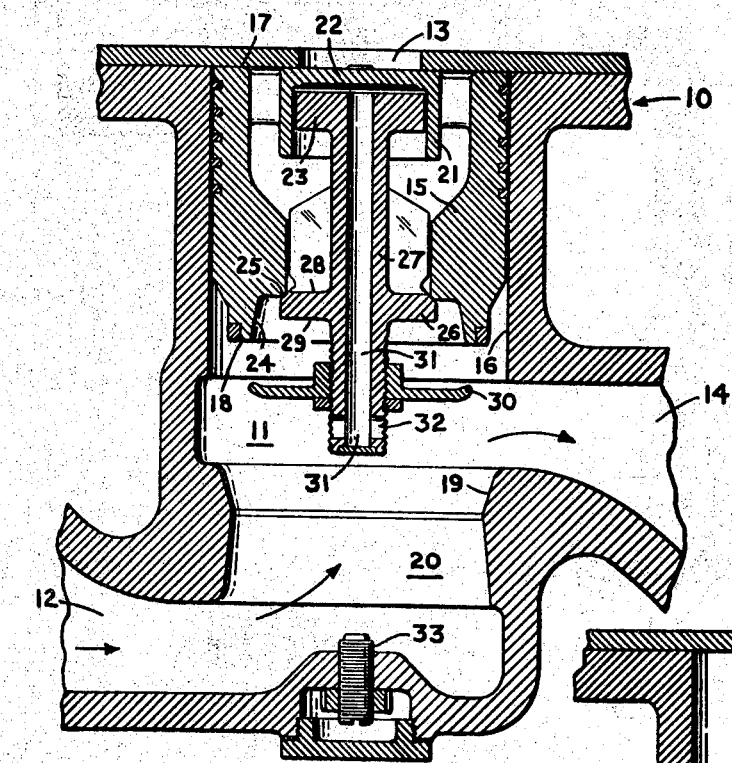
FIG. 1 is a vertical section through the valve showing the valve mechanism in the high flow rate position.

Referring first to FIG. 1 a valve body 10 is shown as having a fluid chamber 11 within the body, said chamber having an inlet port 12, a first outlet port 13 and a second outlet port 14.

Disposed in the body and extending along the vertical axis of fluid chamber 11 is a cylinder 15 which is slidably mounted with respect to the walls or internal surface 16 of the valve or fluid chamber 11. The cylinder 15 at the upper end 17 is of larger diameter than at the lower end 18 for reasons to be more fully explained below relative to the operation of this device.

Figure 2:
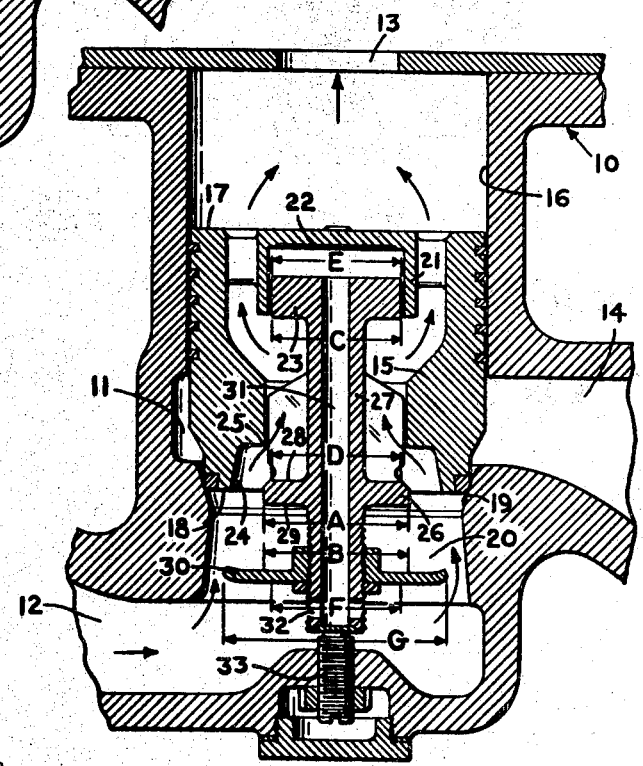
FIG. 2 is a vertical section through the valve showing the valve mechanism in the low flow rate position.

During low flow rate conditions cylinder 15 is in its lowest position as shown in FIG. 2 and engages a valve seat 19 formed in vertical inlet channel 20 below second outlet 14 thereby sealing off outlet 14 and allowing the flow to pass through the cylinder to first outlet port 13.

Formed within cylinder 15 at the upper end 17 thereof is a vertically extending piston cylinder 21 closed at the upper end by closure member 22 dimensioned to receive a balancing piston 23 as will be more fully described below.

Also formed within cylinder 15, at the lower end thereof, is an annular recess 24 dimensioned to form a seating surface 25 for a valve head 26 which will also be described in greater detail below.

Disposed within cylinder 15 for vertical travel therein is a valve stem 27 having disposed about its upper end the balancing piston 23 previously mentioned and at a point intermediate the lower end thereof and the balancing piston 23, the valve head 26.

Valve head 26 is dimensioned such that the upper face 28 thereof is of smaller diameter than lower face 29 and the same diameter as balancing piston 23 all for purposes to be explained under "Operation."

Also disposed about valve stem 27, near the lower end, is an actuator disc 30 dimensioned to pass into inlet channel 20 during low flow rate conditions. The impact of the fluid flow on actuator disc 30 is the actuating force which determines the vertical position of the valve stem 27 and therefore of balancing piston 23, valve head 26, and cylinder 15 all as will be described under "Operation."

Extending axially through valve stem 27 is a bore 31 which intersects a radial bore 32 in valve stem 27 near the lower end thereof and which communicates with the upper face of balancing piston 23 at the upper end. By this means the fluid pressure existing at any given time below actuator 30 will be transmitted to the upper face of balancing piston 23.

As previously mentioned, actuator disc 30 is dimensioned to pass into vertical inlet channel 20 during low flow rate conditions. At a point somewhat below valve seat 19 formed in vertical inlet channel 20, the channel begins to widen as the walls are tapered outward and downward, thus providing an increasing dimension between the circumference of actuator disc 30 and the walls of vertical inlet channel 20 as valve stem 27 moves vertically downward. As the distance between actuator disc 30 and the walls of vertical inlet channel 20 increases the velocity of the fluid flowing around disc 30 decreases thus reducing the force acting on actuator disc 30 all as will be further described under "Operation." The downward movement of valve stem 27 will thus continue until it contacts a stop such as pin 33 inserted in the bottom of valve body 10. As will be seen under the discussion of "Operation" of the invention the unique snap on-off action of the valve is due in large measure to the fact that the walls of vertical inlet channel 20 are tapered to provide a varying distance between actuator disc 30 and the walls.

The unique snap on-off action of the invention lies also in part in the proper dimensioning of the balancing piston 23, actuator disc 30, and valve head 26.

Referring to FIG. 2 it is seen that the pressure existing at any time on area A of valve head 26 is balanced by the pressure acting on area B of actuator disc 30. Similarly, the pressure acting at any given time on area C of balancing piston 23 is balanced by the pressure acting on area D of valve head 26. Finally, the pressure acting at any given time on area E of balancing piston 23 is balanced by the pressure acting on area F of actuator disc 30.

Thus, the only force tending to keep valve head 26 seated on seating surface 25 is that pressure acting on the area G minus F of actuator disc 30 which is greater than the area G minus B. It can be seen that since area A, the area of the lower face of valve head 26, is equal to area B; and area D, the area of the upper face of valve head 26, is equal to area F, if the difference between the areas of the upper and lower faces of valve head 26 is kept small the difference between areas B and F would be small and the static forces acting on these areas can be regarded for all practical purposes as balanced.

Thus the only force acting on the actuator disc 30 will be due to the momentum of the fluid flow and therefore will depend only upon the flow rate and the valve mechanism will operate independently of any pressure differential in the system.

OPERATION

Figure 3:
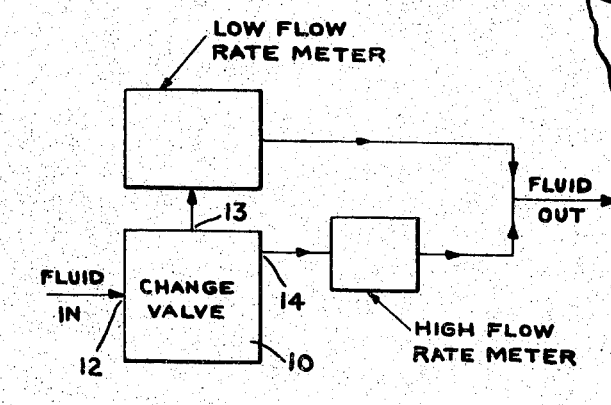
FIG. 3 is a diagrammatic sketch of a metering system including the valve of the present invention.

In operation, and assuming the valve is in use in a fluid flow metering system such as shown in FIG. 3, outlet port 13 is connected to a low flow rate meter and outlet port 14 is connected to a high flow rate meter.

Referring first to FIG. 1, the valve is shown in the high flow rate position. Liquid enters the valve through inlet port 12 and flows upward through vertical inlet channel 20 before impacting on actuator disc 30. This force causes valve head 26 to engage seating surface 25 thereby shutting off any flow of fluid through cylinder 15 to outlet port 13. The upward force of the valve head 26 acting on seating surface 25 of cylinder 15 cause cylinder 15 to remain in its uppermost vertical position thus allowing outlet port 14 to communicate with vertical inlet channel 20.

As the flow rate decreases, and with the forces acting on the various parts of the valve mechanism balanced as previously described, the cylinder 15 and the valve stem 27 with balancing piston 23, valve head 26, and actuator disc 30 move vertically downward as a unit. Thus, valve head 26 is still seated on seating surface 25 and no fluid will flow through cylinder 15.

As the flow rate continues to diminish the cylinder 15 and valve stem 27 continue to assume a lower position in valve body 10 and the actuator disc 30 enters vertical inlet channel 20. As the actuator disc moves lower in the inlet channel the distance between the circumference of the disc and the walls of the inlet channel increases thus reducing the flow velocity around the disc. This in turn, results in a smaller force acting on actuator disc 30 thus allowing it to assume a still lower position in the inlet channel until valve stem 27 contacts pin 33. At this time cylinder 15 will contact valve seat 19 thus closing off outlet port 14 and allowing the flow of fluid through cylinder 15 to outlet port 13 and thus to the low flow rate meter as shown in FIG. 2.

With the flow of fluid through cylinder 15 a pressure drop occurs across the cylinder which tends to lift it from valve seat 19. This is compensated for by providing the cylinder with a larger diameter at the upper end 17 than at the lower end 18 thereof thus increasing the downward force.

The valve will remain in this position until a predetermined flow rate is reached which will cause the valve stem 27 to move upward. As the actuator disc moves upward the distance between the circumference thereof and the walls of inlet channel 20 decreases thereby increasing the fluid flow velocity around the disc. This results in a larger force acting on the actuator disc thus aiding the upward movement until valve head 26 again engages seating surface 25 thus stopping the flow of fluid through cylinder 15. This causes an immediate drop in pressure acting on the upper end 17 of cylinder 15 thus allowing the cylinder to move vertically upward with valve stem 27 and again allowing the flow of fluid through outlet port 14 to the high flow rate meter.

Thus, we have described a unique changeover valve wherein the weights and dimensions of the valve mechanism are so chosen as to provide a snap on-off action at predetermined and clearly defined rates of flow.

It will be understood that the invention is not to be limited to the specific construction or arrangement of parts shown but that they may be widely modified within the invention defined by the claims.

I claim:

1. A valve for directing the flow of fluid into one of two discharge lines dependent upon the rate of fluid flow through the valve comprising:

a valve body having a fluid chamber formed therein with an inlet and a first and second outlet for said fluid;

a cylinder dimensioned to slidably engage the interior of said valve body and having a flow path therethrough communicating at one end with said first outlet and at the other end with said fluid chamber; and means disposed in said cylinder for vertical travel therein to seal off the flow path therethrough to said first outlet while allowing flow to said second outlet at high fluid flow rate condition in said valve and alternatively sealing off said second outlet while allowing flow to said first outlet at a low flow rate condition.

2. A valve in accordance with claim 1 wherein said means disposed in said cylinder for sealing off said flow path therethrough comprises:

a valve stem;

A valve head disposed about said valve stem for vertical travel therewith.

An actuator disc disposed about the lower end of said stem for vertical travel therewith whereby the impact of said fluid flow acting on said disc controls the vertical position of said valve stem; and piston head means disposed about said valve stem at the upper end thereof for vertical travel therewith for balancing the forces acting on said valve head and said actuator disc.

3. A valve in accordance with claim 2 wherein said cylinder has an annular recess formed in the lower end thereof dimensioned to form a valve seat for said valve head during said high flow rate conditions.

4. A valve in accordance with claim 2 including means operatively associated with said cylinder at the upper end thereof dimensioned to slidably receive said piston head means thus acting as a guide for said valve stem.

5. A valve in accordance with claim 3 including means operatively associated with said cylinder at the upper end thereof dimensioned to slidably receive said piston head means thus acting as a guide for said valve stem.

6. A valve in accordance with claim 5 wherein the diameter of the upper face of said valve head is larger than the diameter of the lower face thereof and of the same diameter as said piston head means, and the diameter of said actuator disc is larger than the diameter of the lower face of said valve head.

7. A valve in accordance with claim 6 including means to transmit the fluid pressure existing at any time below said actuator disc to the upper face of said piston head means whereby the force acting downward on said piston head means is balanced by that force acting upward created by the pressure acting on an area on the actuator disc equal to the area of the piston head means.

8. A valve in accordance with claim 7 wherein said means to transmit the fluid pressure to the upper face of said piston head means is an axial bore through said valve stem communicating at the upper end thereof with said piston head means and at the lower end with a radial bore through said valve stem below said actuator disc.

9. A valve in accordance with claim 7 wherein said fluid chamber is dimensioned below said second outlet to form a seating surface for said cylinder whereby at low flow rate conditions said cylinder engages said seating surface thereby stopping the flow of fluid to said second outlet.

10. A valve in accordance with claim 9 wherein said fluid chamber is dimensioned, beginning at a point below said seating surface, to provide a continuously increasing distance between the walls of said fluid chamber and the perimeter of said actuator disc as said valve stem moves vertically downward at low flow rate conditions whereby the velocity of the fluid flow around said actuator disc is continuously reduced thus decreasing the impact of said fluid acting on said actuator disc.

11. A valve in accordance with claim 10 wherein said means to transmit the fluid pressure to the upper face of said piston heads means is an axial bore through said valve stem communicating at the upper end thereof with said piston head means and at the lower end with a radial bore through said valve stem below said actuator disc.

12. In a system for metering the flow of fluid therethrough the combination of:
a high flow rate meter;
a low flow rate meter;
a changeover valve including a valve body having a chamber formed therein with an inlet for said fluid, a first outlet for said fluid connected to said low flow rate meter, and a second outlet for said fluid connected to said high flow rate meter;
a cylinder dimensional to slidably engage the interior of said valve body and having a flow path therethrough communicating at one end with said fluid outlet and at the other end with said fluid chamber; and
means disposed in said cylinder for vertical travel therein to seal off said flow path therethrough to said first outlet while allowing flow to said second outlet at high fluid flow rate condition in said valve and sealing off said second outlet while allowing flow to said first outlet at a low flow rate condition.

13. In the combination as claimed in claim 12, wherein said means disposed for vertical travel in the cylinder comprises:
a valve stem disposed in said flow path;
a valve head connected to and movable with the valve stem to seal off said flow path during high fluid flow rate conditions in said valve;
an actuator disc connected to and movable with said valve stem whereby the impact of fluid flowing in said valve on the disc actuates the vertical position of the valve stem; and
piston head means disposed about and movable with said valve stem at the end remote from the valve disc acts to balance the force exerted by the fluid acting on said actuator disc to control vertical travel of said means.

14. The combination of claim 13 wherein said cylinder has an annular recess formed in the lower end thereof dimensioned to form a valve seat for said valve head during said high flow rate conditions and said fluid chamber is dimensioned below said second outlet to form a seating surface for said cylinder whereby at low flow rate conditions said cylinder engages said seating surface thereby stopping the flow of fluid to said second outlet.

15. The combination of claim 14 wherein said fluid chamber is dimensioned, beginning at a point below said seating surface, to provide a continuously increasing distance between the walls of said fluid chamber and the perimeter of said actuator disc as said valve stem moves vertically downward at low flow rate conditions whereby the velocity of the fluid flow around said actuator disc is continuously reduced thus decreasing the impact of said fluid acting on such actuator disc.

16. A valve in accordance with claim 15 wherein the diameter of the upper face of said valve head is larger than the diameter of the lower face thereof and of the same diameter as said piston head means, and the diameter of said actuator disc is larger than the diameter of the lower face of said valve head.